United States Patent
Rastelli

[11] Patent Number: 5,386,754
[45] Date of Patent: Feb. 7, 1995

[54] CUBE MAKING AND PEELING MACHINE

[75] Inventor: Luigi Rastelli, Villanova Sull 'Arda, Italy

[73] Assignee: Valfor S.r.l., Fornovo Taro, Italy; a part interest

[21] Appl. No.: 67,747

[22] Filed: May 26, 1993

[51] Int. Cl.⁶ .............................................. B26D 7/06
[52] U.S. Cl. .................................. 83/408; 83/326; 83/425.3; 83/431; 83/435.2; 83/932; 99/537; 99/540
[58] Field of Search ............... 83/167, 326, 404, 404.1, 83/408, 425.3, 431, 434, 435, 435.2, 651.1, 661, 932; 99/537, 538, 540

[56] References Cited
U.S. PATENT DOCUMENTS

| | | | |
|---|---|---|---|
| 981,130 | 1/1911 | Smyth | 83/431 X |
| 1,504,383 | 8/1924 | Ruggiero | 83/651.1 X |
| 1,729,269 | 9/1929 | Jagenburg | 83/435.2 X |
| 1,975,261 | 10/1934 | Erickson | 83/404.1 X |
| 2,169,509 | 8/1939 | Wool | 83/435.2 X |
| 2,307,721 | 1/1943 | Weirauch | 83/431 X |
| 3,010,497 | 11/1961 | Pease | 83/408 X |
| 3,154,986 | 11/1964 | Reid | 83/661 X |
| 3,598,163 | 8/1971 | Urschel | 83/408 X |

Primary Examiner—Eugenia Jones
Attorney, Agent, or Firm—Bucknam and Archer

[57] ABSTRACT

A fruit and vegetable cubing or dicing and peeling machine comprises, superimposed onto one another, a first conveyor belt formed by a plurality of equispaced cutting cables, and a second conveyor belt including a plurality of cross cutting blades closely adjoining the cutting cables, an extruding roller being moreover provided above the first conveyor belt for pressing against the cutting cables thereof the fruits or vegetable to be diced.

6 Claims, 2 Drawing Sheets

CUBE MAKING AND PEELING MACHINE

BACKGROUND OF THE INVENTION

The present invention relates to a cube making and peeling machine for fruits, vegetables and the like, and in particular for tomatoes, which substantially comprises a first conveyor belt including a plurality of interexchangeable longitudinal equispaced parallel cables which, during the advancement motion of the first conveyor belt, will engage a cross top rotary extruder roller and a second bottom conveyor belt comprising a plurality of cross equispaced parallel blades.

The fruit slices, and in particular the preheated tomato slices, are deposited on the first conveyor belt and entrained toward the extruder roller.

As they are pressed between the extruder roller and cables of the first conveyor belt, the slices are downwardly pushed between the interspaces of said cables and are cut in longitudinal strips.

Simultaneously, the top end portions of the cross blades of the second bottom conveyor belt provide an upwardly directed pressure thereby forming on said strips cross cuts to reduce the strips into small cubes.

The skin and/or peel portion of the slices, during the operation, is engaged between the surface of the extruder roller and the cables forming the first conveyor belt, and are held engaged with these elements, to be successively detached and/or unloaded therefrom.

Through the interspaces included between the blades of the second bottom conveyor belt, the tomato and/or the like cubes are conveyed and discharged into a suitable collecting hopper.

The cubes are in a smooth or even condition and free of any skins.

As is known, in the food field and in particular in preparing vegetable products to be packaged in cans or the like, the vegetable products are preferably reduced to small pieces of cubes in order to facilitate all of the subsequent processing steps, in particular the preserving, cooking, mixing steps and so on.

In particular, tomatoes are conventionally processed by the above disclosed method in order to prepare tomato based food products, which find a broad use for preparing a lot of foods.

The qualities and advantages of these products, in addition to the basic vegetable characteristics of the used raw-materials, are evaluated depending on the amount of remaining peels or skins and depending on the maturing level of the used vegetables.

With a small remaining peel amount, and with a good maturing level, the quality of the product is considered very satisfactory.

Prior art methods of "cubing" and/or peeling the above mentioned products, use cubing and/or peeling machines which substantially comprise a square mesh net conveyor belt which is driven and held under tension by end rollers.

On this net there are discharged the products which are then conveyed under a plurality of rollers; the pressure provided by these rollers causes the products to be pushed through the net, thereby cutting the products into cubes having size substantially corresponding to the net mesh size.

Such a method, while it is satisfactory from a cube shape standpoint, is however affected by some limitations and drawbacks.

In particular, in this prior art method, hard parts can be introduced and/or processed together with the slices and portions of fruits or tomatoes to be cubed, these hard elements comprising, for example, not perfectly mature fruits, not perfectly cooked fruits or vegetables or wood pieces and the like.

As undesired hard portions are entrained between the end rollers and the net conveyor belt, the meshes of the latter can be deformed or broken, and these damages represent severe economical losses, since they require a full replacement of the conveyor belt, along stop of the system, and, accordingly, a consequent loss of yield.

Anyhow, the economic damage is a comparatively large one with respect to the single net of the conveyor belt: in fact, because of its configuration, the conveyor belt is very expensive.

Another drawback is that a central discharging of the products to be cubed and the construction of prior art cubing and peeling machines are not satisfactory: in fact, these prior art machines have a comparatively large size and their operation is not reliable.

SUMMARY OF THE INVENTION

Accordingly, the main object of the present invention is to overcome the above mentioned drawbacks.

The invention, as claimed in the accompanying claims, achieves the above mentioned object by a cubing and peeling machine for agricultural products in general, and for tomatoes in particular, said machine providing the following results: the cubing operation is performed by associating an extruder roller to a plurality of interexchangeable equispaced parallel cables and a plurality of parallel blades which are perpendicular to the mentioned cables; the roller, cables and blades being caused to mutually contact one another and adhere to one another at a common point of substantial tangency; the longitudinal cables and cross blades being associated and coupled to one another according to a belt arrangement, with the belts being mounted on end driving rollers; the slices of agricultural products and, in particular, the tomatoe slices being discharged or deposited onto the conveyor belt comprising the parallel and longitudinal cables and therealong being conveyed under the pressing roller which is substantially tangent to the bottom parallel blades, according to a longitudinal and continuous arrangement.

The advantages provided by the present invention consist essentially of the fact that the cubing operation, that is the cross and longitudinal cutting of the slices, is simultaneously performed by means of the operation of the parallel cables and perpendicular blades which tangentially contact the extruder roller; the skins and/or peels are substantially entrapped, during the cubing operation, between the surface of the extruder roller and the longitudinal cables, so as to be removed from the pulp cubes which are discharged downstream of the perpendicular blades; a possible presence of hard solid bodies can cause the breakage of exclusively some cables which, anyhow, can be replaced in a comparatively short time, with a small cost which is much less than that associated with a stopping of the cubing and peeling operation.

BRIEF DESCRIPTION OF THE DRAWINGS

The invention will be disclosed in a more detailed way hereinafter, based on some embodiments thereof, which are illustrated, by way of an exemplary and not limitative example, with reference to the accompanying drawings, where.

DESCRIPTION OF THE PREFERRED EMBODIMENTS

Figure 1:
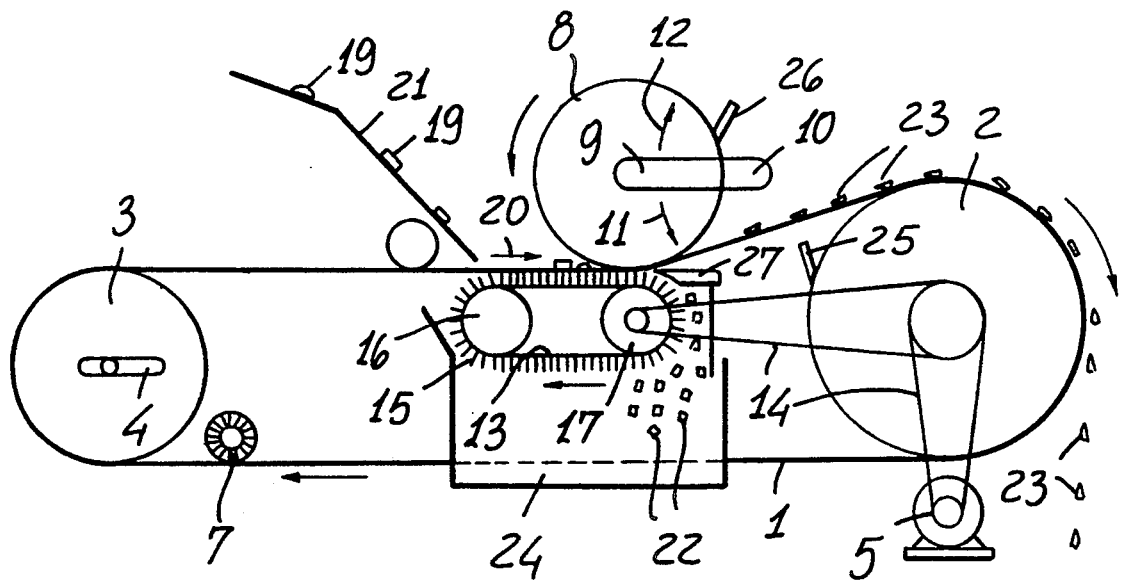
FIG. 1 is a schematic side view of a first embodiment of a cubing and peeling machine.

The figures show a cubing and peeling machine for food agricultural products and, in particular, tomatoes and the like, which substantially comprises a first conveyor belt, including a plurality of inter-exchangeable parallel and equispaced cables, which are held under tension by a tension front roller 2 and a rear driven roller 3 provided with a tension or pulling element 4.

The driving roller 2 is driven by a speed varying unit, and the conveyor belt 1 comprises a cable guiding roller 6 and a brush or scraper element 7.

Coupled with the conveyor belt 1 there is provided a tension-extruder roller 8 which is mounted substantially transversely of the cables of said conveyor belt and is supported by side levers 9 articulated at their rear end portions 10.

The roller 8, in addition to providing a further tension element for the conveyor belt 1, by pressing by its weight downwardly as shown by the arrow 11, can upwardly swing, as indicated by the arrow 12, if any undesired hard body, such as a not mature fruit piece or a wood piece or the like, penetrates between its peripheral surface and the cable 1 of the underlying conveyor belt.

At a nearly parallel and/or tangent position to the contacting region between the extruder roller 8 and conveyor belt 1, under the latter, there is arranged a second conveyor belt 13, which comprises a chain or belt arrangement, thereon there are arranged parallel and equispaced cross blades 15.

More specifically, the second conveyor belt 13 is mounted on a rear driven roller 16 and a front motor driven entraining roller 17.

According to a preferred and inexpensive embodiment, the driving by means of the speed varying unit 5 represents a single drive which is used both for the entraining roller 2 of the conveyor belt 1 and for the entraining roller 17 of the conveyor belt 13.

To this end, the speed varying unit 5 is connected to the above mentioned rollers by means of a pulley and belt system, a sprocket and chain system, a gear wheel system or the like.

The provision of a speed varying unit 5 is very advantageous and preferred, since it is possible to change thereby the advancing speed of the conveyor belts depending on the products to be processed.

In this connection it should be moreover pointed out that it would be also possible to provide a drive assembly, either of a variable or of a constant speed type, which can be independently assembled for each conveyor belt.

The arrangement of the second conveyor belt 13 with respect to the first conveyor belt 1 is substantially and preferably a parallel arrangement, with the top end portions 18 of the blades 15 which are arranged very close to the cables of said first conveyor belt at least near or at the front of the tangency point with the extruder roller 8.

The slices of pieces 19 of fruits or tomatoes to be cubed are discharged onto the parallel cable conveyor belt 1, for example through a hopper or a slanted plane 21 arranged upstream of the extruder roller 8.

The conveyor belt 1, during its advancement movement according to the arrow 20, will entrain the pieces 19 under said roller which, by pressing downwardly, will cause the longitudinal cables to cut the pieces thereby providing longitudinal slices. If undesired hard bodies are included in the fruits or vegetables which can not be cut by the cables 1, then the extruder roller 8 will be upwardly pushed by said hard pieces which, accordingly, will pass between the outer surface of the roller and the cables 1 to be then discharged upstream of the entraining or driving roller 2.

In order to facilitate the passage of the hard pieces between the roller 8 and cables 1, and in order to support the weight of the roller by means of the resiliency of the above mentioned cables, the blades 15 of the underlying conveyor belt 13 are provided with slots 28 aligned with said cables, in which the cables can be engaged in a released-stress temporary condition.

This arrangement facilitates the cutting operations and/or the hard pieces removing operation without damaging the machine components.

As, on the contrary, the longitudinal slice cut is properly performed, under the cables 1, the top end portions 18 of the cross blades 15 will engage the downwardly pushed longitudinal slices and will transversely cut them so as to provide the cubes 22.

During this operation, the major part of the skins or peels 23 is entrapped between the peripheral surface of the extruder roller 8 and the top portion of the cables 1.

As the second conveyor belt 13 turns about its roller 17, the blades 15 diverge at the top and open, thereby the cubes 22 fall downwardly and are collected in a discharging hopper 24, whereas said skins or peels are held substantially engaged on the cables, to be discharged during the turning movement about the front entrainment or driving roller 2. Other skins or peels can adhere to the surface of the extruder roller 8. Anyhow, the above mentioned rollers are provided with scraper elements 25 and 26 which hold the surfaces of said rollers clean and remove all of the possible undesired residues.

A scraper element 27, having substantially like functions, is substantially arranged near the tangency point of the extruder roller 8 with the cables 1 and the conveyor belt 13.

From the discharging hopper 24, the cubes can be conveyed to subsequent processing steps, either directly or through further devices for removing skins, seeds, liquids and/or the like.

Figure 2:
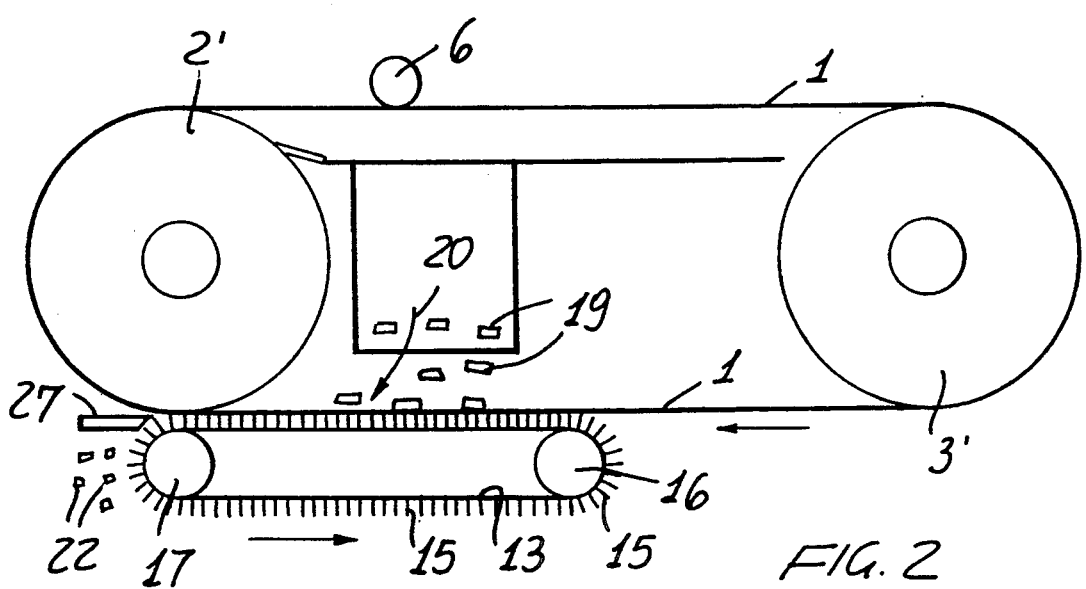
FIG. 2 is a schematic side view of a second embodiment of a cubing and peeling machine.
Figure 3:
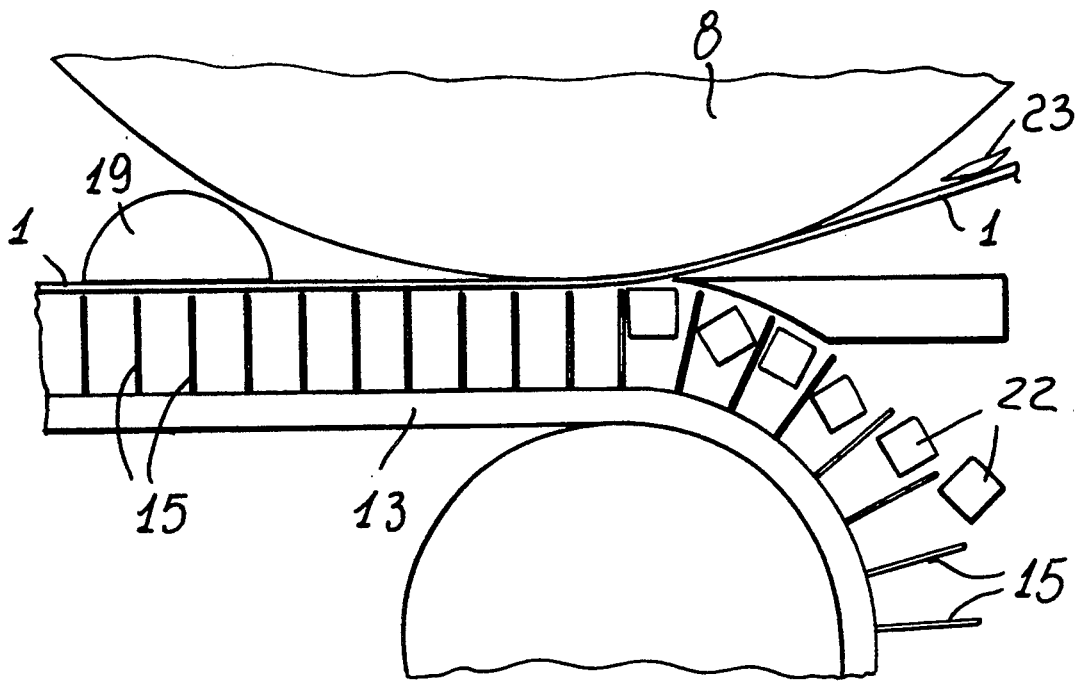
FIG. 3 illustrates an enlarged detail of a tangency point of the extruder roller, parallel-cable conveyor belt and cross-blade conveyor belt.
Figure 4:
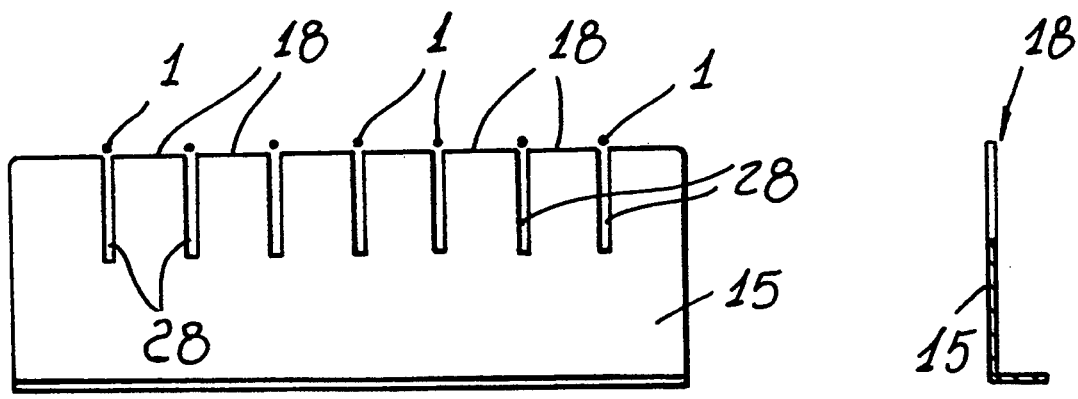
FIG. 4 is a front view of a blade.

A possible variation of the cubing machine according to the present invention is shown in FIG. 2, in which, to provide a further simplification, the operation of the extruder roller is provided by one of the above mentioned driving rollers of the parallel cable conveyor belt 1, for example by the driving roller 2'. In this case, the second conveyor belt 13, also including a plurality of blades 15, is aligned with said driving roller, whereas the hopper or slanted plane is arranged between the conveying portion and return portion of the above mentioned cable conveyor belt 1.

The operating steps and functional overall operation are the same; it is also evident, on the other hand, that modifications to the constructions or detail can also be made, without departing from the scope of the invention.

Thus, for example, the width of the blades 15, the length of the extruder roller 8, the width extension of the cable conveyor belt 1, the distance or pitch between the cables 1, the number of blades 15 provided on the conveyor belt 13 can also be changed, depending on the products to be processed and/or on the yield to be achieved.

From the above disclosure and from the drawings, it should be apparent that the machine according to the invention has a construction which is more simpler and unexpensive than that of available like machines; that the operating cost is smaller since, instead of net or chain elements, there are used cables which, if they are broken, can be individually replaced at a very reduced cost; that possible hard elements do not damage the machine construction since the extruder roller is capable of swinging, and the cables are resilient and the blades are provided with passaging slots.

Finally it should be pointed out that, for example with reference to the processing of tomatoes, the not mature and/or green parts can be discharged either by exploiting the swinging capability of the extruder roller by applying suitable counter-biassing springs, and reducing the pressure of the roller by means of pneumatic system or the like, calibrated with preset pressures.

In a further embodiment, the second conveyor belt 13 can be replaced by a simple driven roller, not shown, on the peripheral surface whereof there are applied parallel and equispaced blades or reeds, either fixed or suitable to be properly oriented.

I claim:

1. A fruit and vegetable cubing and peeling machine, comprising a first conveyor belt including a plurality of equispaced parallel cutting cables for cutting through fruits or vegetables, a cross extruder roller arranged above said cutting cables for downward pressing the fruits or vegetables to be diced against said cutting cables for cutting through said fruits or vegetables in a substantially longitudinal direction, and a second conveyor belt arranged under at least a portion of said first conveyor belt and provided with a plurality of cross cutting blades closely adjoining said cables of said first conveyor belt and providing an upwardly directed cutting pressure for further cutting through said fruits or vegetables in a direction substantially transverse to said longitudinal direction so as to provide fruit or vegetable dices.

2. A machine according to claim 1, wherein said first conveyor belt is entrained between a front driving roller and a rear driven roller provided with a tension element, said first conveyor belt cooperating with at least a guide roller and a brush element, the front driving roller being provided with a scraper element and the first conveyor belt being arranged in a contact and tension relationship with respect to said extruder roller.

3. A machine according to claim 1, wherein said extruder roller is swingably mounted on lever arms and being provided with a scraper element and being adapted to be urged with an adjustable pressure against said first conveyor belt.

4. A machine according to claim 1, wherein said cross cutting blades include a plurality of slots spaced from one another with a spacing equal to that of said equispaced parallel cutting cables.

5. A machine according to claim 1, wherein said cutting cables are independent from one another and are interexchangeable.

6. A machine according to claim 1 wherein said first conveyor belt and said second conveyor belt are driven by variable speed driving means.

* * * * *